Figure 1:
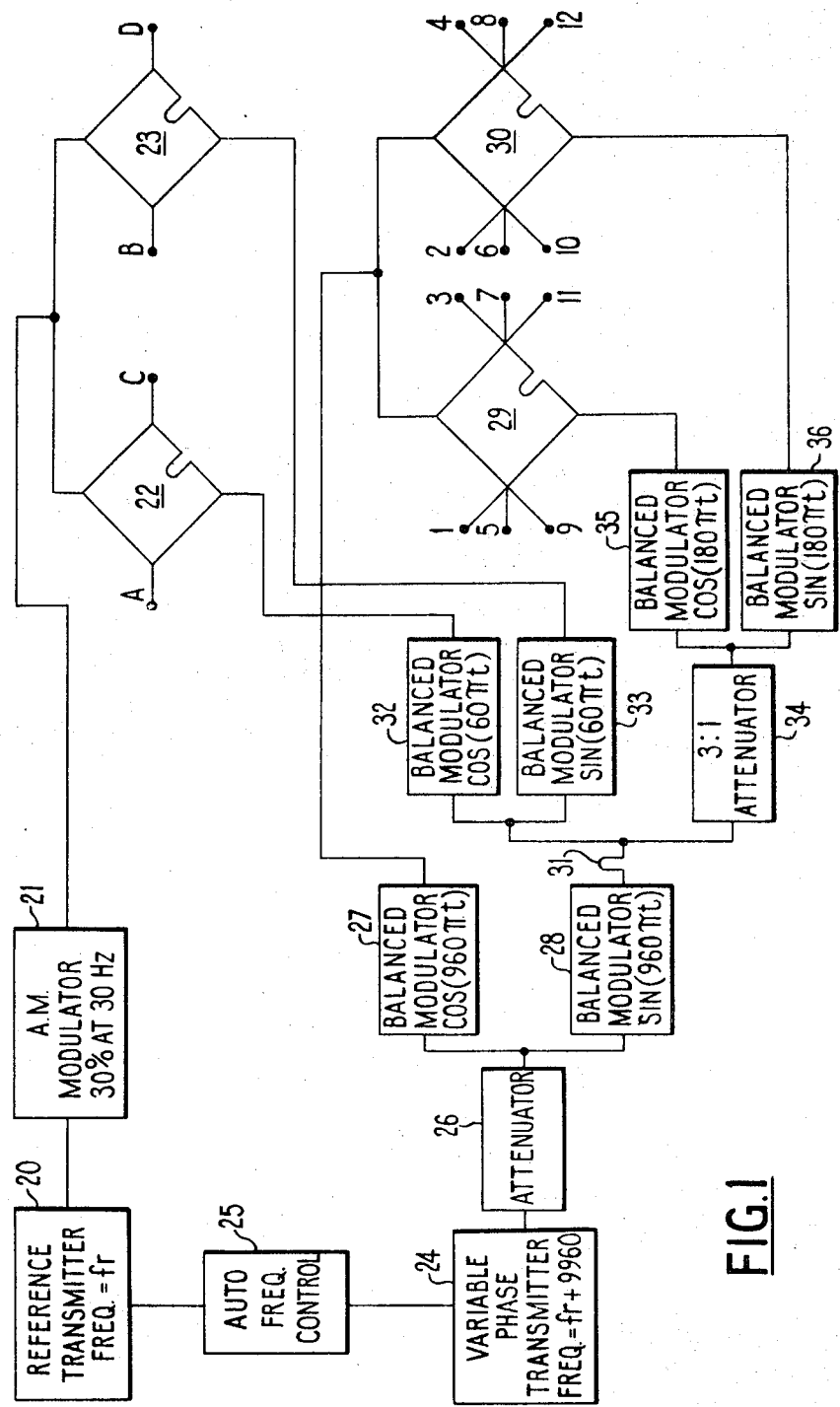

United States Patent

[11] 3,631,495

[72] Inventor Robert Walter Redlich
Jannali, New South Wales, Australia
[21] Appl. No. 824,568
[22] Filed May 14, 1969
[45] Patented Dec. 28, 1971
[73] Assignee The University of Sydney
Sydney, New South Wales, Australia
[32] Priority May 24, 1968
[33] Australia
[31] 38279

[54] OMNIDIRECTIONAL NAVIGATION TRANSMISSION SYSTEM AND APPARATUS
10 Claims, 10 Drawing Figs.

[52] U.S. Cl. .................................................. 343/106 D
[51] Int. Cl. .................................................. G01s 1/38
[50] Field of Search ........................................ 343/106, 106 D

[56] References Cited
UNITED STATES PATENTS

| | | | |
|---|---|---|---|
| 2,422,110 | 6/1947 | Luck .......................... | 343/106 |
| 2,715,727 | 8/1955 | Pickles ...................... | 343/106 |

*Primary Examiner*—Rodney D. Bennett, Jr.
*Assistant Examiner*—Richard E. Berger
*Attorney*—Irving M. Weiner

ABSTRACT: This invention relates to an omnidirectional navigation transmission system for aircraft wherein a "reference" phase signal which is amplitude modulated at a selected frequency is radiated omnidirectionally, and wherein a "variable" phase signal which is frequency modulated by a signal of approximately square waveform is radiated to produce a rotating field in space, said variable phase signal being frequency modulated at said selected frequency and being phase locked with said reference phase signal whereby bearing information may be derived from said signals at a receiver with reference to a point at which both said signals will be received exactly in phase.

Patented Dec. 28, 1971

3,631,495

3 Sheets-Sheet 2

$\frac{4}{\pi} \text{SIN } 2\pi f_D t \cdot \text{SIN } 960 \pi t \cos 60\pi t$      $\frac{4}{\pi} \text{SIN } 2\pi f_D t \cdot \text{SIN } 960 \pi t \text{ SIN } 60\pi t$ $\cos 2\pi f_D t \cdot \cos 960 \pi t$ $\frac{-4}{3\pi} \text{SIN } 2\pi f_D t \cdot \text{SIN } 960 \pi t \cos 180\pi t$      $\frac{-4}{3\pi} \text{SIN } 2\pi f_D t \cdot \text{SIN } 960 \pi t \text{ SIN } 180\pi t$ $-\dfrac{5\pi}{2}$  $-\dfrac{3\pi}{2}$  $-\dfrac{\pi}{2}$  $\dfrac{\pi}{2}$  $\dfrac{3\pi}{2}$  $\dfrac{5\pi}{2}$

OMNIDIRECTIONAL NAVIGATION TRANSMISSION SYSTEM AND APPARATUS

This invention relates to an improved omnidirectional navigation system for aircraft and, more particularly, to a system of transmitting information to an aircraft from which bearing or directional information may be derived.

An omnidirectional radio range (generally, and hereinafter referred to as VOR) has been heretofore employed for aircraft navigation. Such system generally operates in the VHF band (from 112–118 MHz) and provides a direct reading of the bearing between the aircraft receiver and the VOR transmitter. However, as will be hereinafter shown, the known (or, as hereinafter referred to, standard) VOR system is vulnerable to disturbances caused by such reflecting objects as mountains or buildings and must be carefully sited if standard accuracy specifications of about ±2° are to be met.

The standard VOR system signal carries bearing information as a phase difference between two 30 Hz. signals. One of these, termed reference phase, is radiated omnidirectionally as a frequency modulated (FM) signal on a 9,960 Hz. subcarrier and is recovered in the aircraft receiver by a limiter and FM discriminator. The other signal, termed variable phase, is radiated as a rotating 30 Hz. amplitude modulated (AM) field, typically by an arrangement for four loop antennas in a square configuration. The FM reference is phase locked to the rotating signal so that a receiver within an aircraft due north of the transmitter would receive both 30 Hz. signals exactly in phase, and as the aircraft moves around the transmitter the phase difference between the reference and rotating phases will vary. If follows from this, and it may be readily proved, that the phase of rotating AM field is, in the absence of reflected signals, numerically equal to the azimuth angle. If however reflected signals exist, they can shift the phase of the rotating AM signal by an amount not exceeding the ratio of reflected to direct signal, in radians.

Thus, to achieve the aforementioned accuracy specification of ±2° it is necessary that any reflected signals be less than 2/57.3 times the strength of the direct signal; this being a particularly stringent condition which can be made even more rigorous by small errors in radiation patterns or modulation waveforms.

In an attempt to overcome, or at least reduce, the susceptibility to errors of the standard VOR transmitting system, a modification of this system was developed for use with the standard receivers. This modified system, which is generally referred to as "Doppler" VOR (or DVOR), is a system in which the VOR signal is "inverted." That is, reference phase is transmitted omnidirectionally as AM, and variable phase as a rotating FM field. The aerial typically consists of a ring of 50 loop antennas on a 45-foot diameter circle, and a single loop antenna at the center of the circle which transmits reference phase. A commutator excites essentially one loop of the ring at a time and traverses the whole ring in one-thirtieth of a second. In this way continuous rotation at 30 Hz. of a single loop is simulated, and a rotating FM signal can e regarded as resulting from Doppler effect. In order that the system may be compatible with normal receivers, the carrier signal supplied to the commutator is displaced from the reference carrier by 9,960 Hz. so that the variable signal beats against reference and appears as FM on a 9,960 Hz. subcarrier.

It will be appreciated that while the "Doppler" VOR system essentially solved the problem of errors due to reflections, it is however extremely expensive, requires a large aperture and a large counterpoise, and is fundamentally complicated. Additionally, it reduces siting errors to a level well below the errors introduced by most receivers, so that, in a sense, a significant part of its capacity to reduce siting errors is redundant.

Accordingly, it is an object of the present invention to provide an improved omnidirectional navigation transmission system which obviates the above-mentioned problems associated with known transmission systems and which, preferably, is compatible with standard receivers.

The present invention provides an omnidirectional navigation transmission system wherein a reference phase signal which is amplitude modulated or frequency modulated at a frequency $f_1$ is radiated omnidirectionally, and a variable phase signal which is frequency modulated (when said reference phase signal is amplitude modulated) or amplitude modulated (when said reference phase signal is frequency modulated) is radiated to produce a rotating field, said variable phase signal being modulated at frequency which bears a fixed relationship to said frequency $f_1$.

Said variable phase signal is preferably obtained by transmitting a different one of the Fourier components of a square-wave modulated signal from each of a series of concentric antenna arrays; although, as is hereinafter described, two concentric antenna arrays, one of which transmits the first Fourier component and the other of which transmits the second component, provides a satisfactory (approximately square) composite waveform.

Also, said variable phase signal is preferably frequency modulated at said frequency $f_1$, the reference phase signal then comprising an amplitude modulated signal.

In order that the system according to the present invention may be compatible with existing VOR receivers, the reference phase is preferably transmitted as a sinusoidal 30 Hz. amplitude modulated signal and the variable phase is preferably transmitted as a square-wave 30 Hz. frequency modulated signal. Also, the variable phase signal carrier frequency employed is preferably equal to the reference carrier frequency plus (or minus) 9,960 Hz., in order to obtain the effect of a 9,960 Hz. subcarrier when the variable phase signal beats against the reference phase carrier.

The amplitude modulated reference signal is phase locked with the variable phase rotating signal such that bearing information may be derived from said signals (by vector analysis) with reference to a point at which both said signals will be received exactly in phase.

Transmission of the variable phase information is, as above mentioned, achieved by transmitting, preferably, two of the Fourier components of exact square wave FM. Exact square waver FM at 30 Hz. it will be appreciated, amounts to switching at a 30 Hz., rate between frequencies (carrier +480 Hz.) and (carrier −480 Hz.) the 480 Hz. signal being the standard VOR frequency deviation.

Figure 2A:
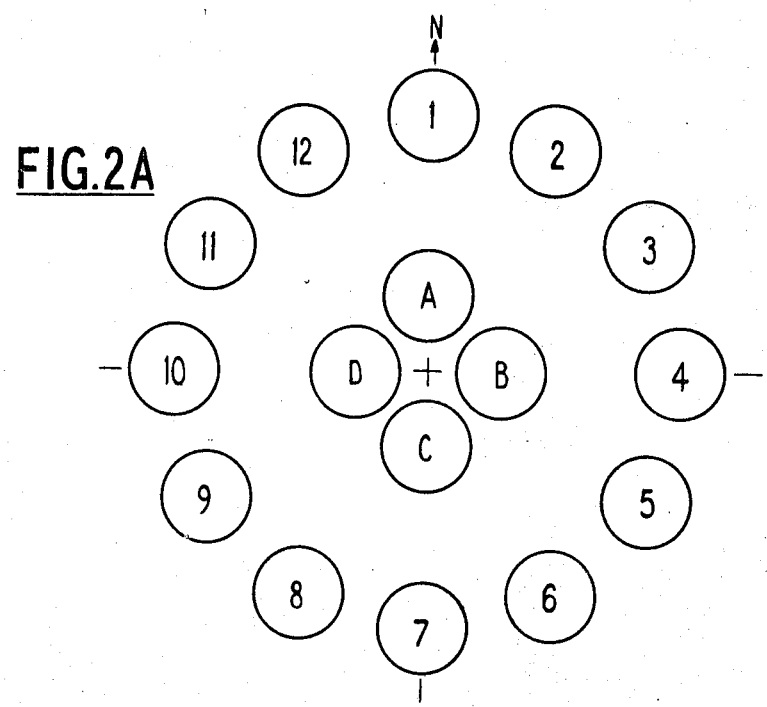
Figure 2B:
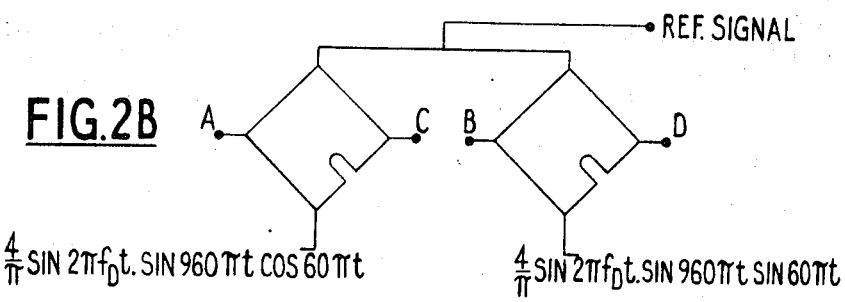
Figure 2C:
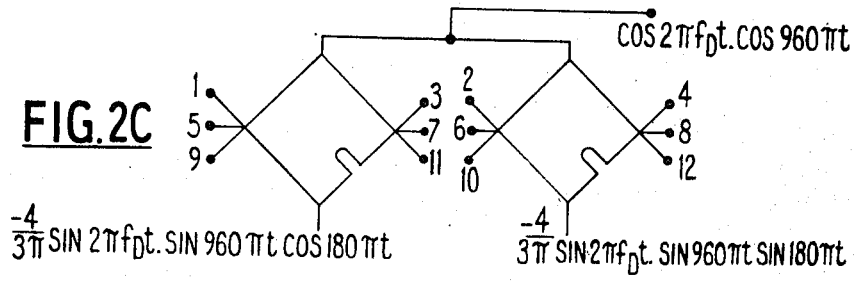
Figure 3A:
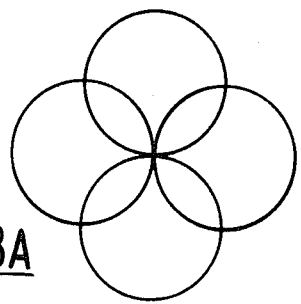
Figure 3B:
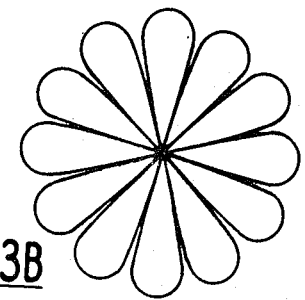

The invention will be more fully understood from he following description of a preferred embodiment thereof taken in conjunction with the accompanying drawings wherein:

FIG. 1 shows a block diagram of a drive system for a transmitter,

FIG. 2A illustrates, schematically, a typical aerial configuration which comprises two concentric antenna arrays, FIG. 2B shows the hybrid feeder devices for the inner array (which comprises the elements A to C) together with the appropriate excitation functions as produced in the drive system o FIG. 1, FIG. 2C shows the hybrid feeder devices for the outer array (which comprises the elements 1 to 12) together with the appropriate excitation functions as produced in the drive system of FIG. 1, FIG. 3A shows the radiation pattern produced by the inner array of FIG. 2A, FIG. 3B shows the radiation pattern produced by the outer array of FIG. 2A, and FIGS. 4A to 4D show signal waveforms which are representative of, (A) an exact square-wave "variable phase" signal, (B) the first Fourier component of the exact square-wave signal, (C) the second Fourier component of the exact square-wave signal, and (D) an approximately square-wave (composite) signal derived from he components B and C.

Referring to FIG. 1, a reference phase carrier signal of frequency $f_r$ is generated in the "reference transmitter" 20. This signal is 30 percent amplitude modulated at, preferably, 30 Hz. at modulator 21 and is fed to the hybrid rings, indicated by numerals 22 and 23, feeding the antenna elements A, B, C and D of the aerial system shown in FIG. 2A.

The reference phase is transmitted omnidirectionally as a 30 Hz. amplitude modulated field.

Variable phase information is transmitted as an approximately square-wave FM signal to produce a rotating field in space, this being achieved (in accordance with the preferred embodiment of the invention) by transmitting two of the Fourier components of exact square-wave FM, one from each of the two concentric antenna arrays shown in FIG. 2A. Thus, with reference to FIG. 1, a carrier signal is generated by the "variable phase transmitter" 24, the (variable) carrier frequency being equal to the reference carrier frequency $(f_r)$ plus 9,960 Hz. in order to obtain the effect of a 9,960 Hz. subcarrier when the variable phase signal beats against the reference phase carrier.

An automatic frequency control device 25 is located in circuit between the reference signal transmitter 20 and the variable phase signal transmitter 24 in order to maintain the desired frequency relationship between the output of the two transmitters.

The output from the "variable phase transmitter" 24 is attenuator 26 to achieve a desired amplitude relationship between the "reference" and "variable" phase signals and is divided into first and second networks, the first network comprising a balanced modulator 27 for modulating the (carrier) signal according to the function $\cos(960\pi t)$ and the second network comprising a balanced modulator 28 for modulating the signal according to the function $\sin(960\pi t)$. Output from the first network provides a common input for one side of the hybrid rings 29 and 30 which feed the loop antennas 1 to 12, in phase, as shown in FIG. 2, to produce an omnidirectional field pattern.

Output from the second network is conditioned at 31 such that the $\sin(960\pi t)$ modulated signal is caused to lag the $\cos(960\pi t)$ modulated signal output from the first network by 90° and the resultant signal is divided into third and fourth networks.

The signal input to the third network is, in turn, divided between the two balanced modulators 32 and 33 wherein it is further modulated according to the respective functions $\cos(60\pi t)$ and $\sin(60\pi t)$. The outputs of the modulators 32 and 33 are fed as inputs to the hybrid rings 22 and 23 of the antenna elements A to D (as shown in FIGS. 1 and 2) and such inputs comprise the first Fourier components (or first harmonics)—$\sin\theta$ and $\cos\theta$—of the approximately square-wave signal aforementioned.

The signal input to the fourth network is attenuated in the 3:1 attenuator 34 to condition the signal to a required second Fourier component (or third harmonic) amplitude relative to that of the first Fourier component and such signal is divided between the two balanced modulators 35 and 36 where it is modulated according to the respective functions $\cos(180\pi t)$ and $\sin(180\pi t)$. The outputs from the modulators 35 and 36 are fed as inputs to the hybrid rings of the antenna elements 1 to 12, such inputs comprising the second Fourier components (or third harmonics)—$\sin 3\theta$ and $\cos 3\theta$—of the approximately square-wave signal.

FIGS. 3A and 3B illustrate the radiation patterns transmitted from the inner and outer antenna arrays respectively responsive to feeding of the aforedescribed derived inputs to the associate hybrid rings. Both patterns are transmitted simultaneously to achieve rotating fields and they are composed of the $\sin\theta$ and $\cos\theta$, and $\sin 3\theta$ and $\cos 3\theta$ functions respectively.

Derivation of the above-mentioned excitation functions is best explained by way of the following mathematical analysis.

If the variable phase carrier frequency is designated $f_D$, the required signals for exact square waver FM are, $$e^{j2\pi(f_D+480)t} \text{ and } e^{j2\pi(f_D-480)t}$$

but $$e^{j2\pi(f_D+480)t} = e^{j2\pi f_D t}(\cos 960\pi t + j\sin 960\pi t)$$

and $$e^{j2\pi(f_D-480)t} = e^{j2\pi f_D t}(\cos 960\pi t - j\sin 960\pi t)$$

Figure 4A:
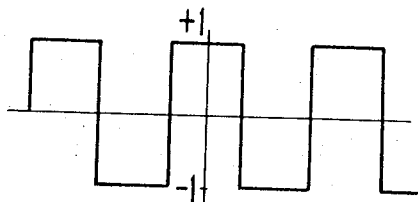

In the above, the transitions of algebraic sign which mark frequency switching should rotate at a 30 Hz. rate. This can be represented symbolically as: Variable phase signal $= e^{j2\pi f_D t}(\cos 960\pi t + jS(60\pi t - \theta)\sin 960\pi t)$ where S is a unit square wave having the formula $S(60\pi t - \theta)$, as shown in FIG. 4A.

Figure 4B:
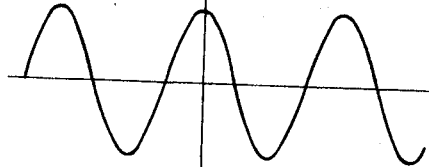
Figure 4C:
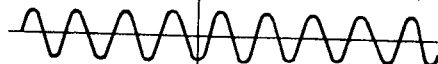
Figure 4D:
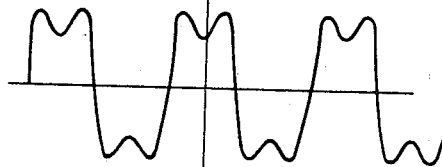

In accordance with the preferred embodiment of the present invention, only the first two terms in the Fourier expansion of $S(60\pi t - \theta)$ are employed to produce the approximately square waveform as is represented by FIG. 4D. These are:

$$\frac{4}{\pi}\cos(60\pi t - \theta) \text{—represented by Figure 4B}$$

and $$\frac{4}{3\pi}\cos(180\pi t - 3\theta) \text{—represented by Figure 4C}$$

The above terms can be expanded into:

$$\frac{4}{\pi}\cos(60\pi t - \theta) = \frac{4}{\pi}[\cos\theta\cos 60\pi t + \sin\theta\sin 60\pi t]$$

$$-\frac{4}{\pi}\cos(180\pi t - 3\theta)$$

$$= -\frac{4}{3\pi}[\cos 3\theta\cos 180\pi t + \sin 3\theta\sin 180\pi t]$$

Thus, the variable phase signal used in the present invention is:

$$e^{j2\pi f_D t}\left\{\cos 960\pi t + j\frac{4}{\pi}\{[\cos\theta\sin 960\pi t\cos 60\pi t \right.$$

$$+ \sin\theta\sin 960\pi t\sin 60\pi t] - \tfrac{1}{3}[\cos 3\theta\sin 960\pi t\cos 180\pi t$$

$$\left. + \sin 3\theta\sin 960\pi t\sin 180\pi t]\}\right\}$$

These terms are radiated by antennas having azimuth patterns and excitations as in the following table 1:

TABLE 1

| Pattern | Excitation | "Equivalent" excitation function |
|---|---|---|
| Omnidirectional | $e^{j2\pi f_D t}\cos 960\pi t$ | $\cos 2\pi f_D t \cdot \cos 960\pi t$ |
| $\cos\theta$ | $\frac{4j}{\pi}e^{j2\pi f_D t}\dfrac{\sin 960\pi t}{\cos 60\pi t}$ | $\frac{4}{\pi}\sin 2\pi f_D t \cdot \dfrac{\sin 960\pi t}{\cos 60\pi t}$ |
| $\sin\theta$ | $\frac{4j}{\pi}e^{j2\pi f_D t}\dfrac{\sin 960\pi t}{\sin 60\pi t}$ | $\frac{4}{\pi}\sin 2\pi f_D t \cdot \dfrac{\sin 960\pi t}{\sin 60\pi t}$ |
| $\cos 3\theta$ | $-\frac{4j}{3\pi}e^{j2\pi f_D t}\dfrac{\sin 960\pi t}{\cos 180\pi t}$ | $\frac{4}{3\pi}\sin 2\pi f_D t \cdot \dfrac{\sin 960\pi t}{\cos 180\pi t}$ |
| $\sin 3\theta$ | $-\frac{4j}{3\pi}e^{j2\pi f_D t}\dfrac{\sin 960\pi t}{\sin 180\pi t}$ | $\frac{4}{3\pi}\sin 2\pi f_D t \cdot \dfrac{\sin 960\pi t}{\sin 180\pi t}$ |

The "equivalent" excitation functions constitute the real component of the excitation functions expressed in the second column of the table.

The aerial system for radiating the required patterns is illustrated in FIG. 2. However the loops A, B, C and D which form the inner array and as are shown in this arrangement may be replaced by a standard VOR slot aerial which would radiate the required patterns, $\sin\theta$ and $\cos\theta$.

The outer ring of the aerial comprises 12 Alford loop antennas (in order to eliminate undesireable vertically polarized radiation) which are located on a circle having a circumference of approximately 3 wavelengths. The loops 1, 3, 5, 7, 9 and 11 radiate the $(\cos 3\theta)$ function while the loops 2, 4, 6, 8, 10 and 12 radiate the $(\sin 3\theta)$ function, and drive system shown facilitates omnidirectional signals to be simultaneously radiated from loops A–D and 1–12.

With the arrangement aforedescribed, siting errors of the transmission system are reduced to at least the level of standard receiver errors, and with a system having a diameter of about 10 feet.

I claim:

1. In an omnidirectional navigation transmission system, means to radiate omnidirectionally a reference phase signal which is amplitude modulated at a frequency $f_1$, and means to radiate a variable phase signal which is frequency modulated by a signal of approximately square waveform to produce a rotating field, said variable phase signal being frequency modulated at a frequency which bears a fixed relationship to said frequency $f_1$.

2. In an omnidirectional navigation transmission system, means to radiate omnidirectionally a reference phase signal which is frequency modulated at a frequency $f_1$, and means to radiate a variable phase signal which is amplitude modulated by a signal of approximately square waveform to produce a rotating field, said variable phase signal being amplitude modulated at a frequency which bears a fixed relationship to said frequency $f_1$.

3. An omnidirectional navigation transmission system comprising, in combination:
   means to radiate omnidirectionally a reference phase signal which is amplitude modulated at a frequency $f_1$; and
   means to radiate a variable phase signal which is frequency modulated by a signal of approximately square waveform to produce a rotating field;
   said variable phase signal being frequency modulated at a frequency which bears a fixed relationship to said frequency $f_1$; and
   wherein said means to radiate said variable phase signal includes means to transmit a different one of the Fourier components of a square wave frequency modulated signal from each of a series of concentric antenna arrays.

4. An omnidirectional navigation transmission system comprising, in combination:
   means to radiate omnidirectionally a reference phase signal which is amplitude modulated at a frequency $f_1$; and
   means to radiate a variable phase signal which is frequency modulated by a signal of approximately square waveform to produce a rotating field;
   said variable phase signal being frequency modulated at a frequency which bears a fixed relationship to said frequency $f_1$; and
   wherein said means to radiate said variable phase signal includes means to transmit the first two Fourier components of a square-wave modulated signal;
   the said first component being transmitted from one of a pair of concentric antenna arrays and the said second component being transmitted from the second of said pair of arrays.

5. An omnidirectional navigation transmission system as claimed in claim 4 wherein that said one of the pair of arrays comprises a square arrangement of four loop antennas and the said second of the pair or arrays comprises an outer ring of twelve loop antennas.

6. An omnidirectional navigation transmission system as claimed in claim 1 including means to modulate said variable phase signal at said frequency $f_1$.

7. An omnidirectional navigation transmission system comprising in combination:
   means to radiate omnidirectionally a reference phase signal which is amplitude modulated at a frequency $f_1$;
   means to radiate a variable phase signal which is frequency modulated by a signal of approximately square waveform to produce a rotating field;
   said variable phase signal being frequency modulated at a frequency which bears a fixed relationship to said frequency $f_1$;
   means to transmit said reference phase signal as a sinusoidal 30 Hz. amplitude modulated signal; and means to transmit the variable phase signal as an approximately square wave 30 Hz. frequency modulated signal;
   the variable phase signal carrier frequency being equal to the reference phase signal carrier frequency plus (or minus) 9,960 Hz., to obtain the effect of a 9,960 Hz. subcarrier when the variable phase signal beats against the reference phase signal carrier frequency.

8. An apparatus for producing an omnidirectional navigation transmission signal comprising, means for producing a reference phase signal which is amplitude modulated at a frequency $f_1$, means for separately producing at least the first and second Fourier harmonics of a variable phase square wave frequency modulated signal, said variable phase signal being frequency modulated at said frequency $f_1$, means for producing an omnidirectional signal component of said variable phase signal, and at least two antenna arrays from each of which a different one of the variable phase signal harmonics is radiated to produce a rotating field, said reference phase signal being transmitted from one of said arrays and said omnidirectional signal component of the variable phase signal being transmitted from another of said arrays simultaneously with transmission of said variable phase signal.

9. An apparatus as claimed in claim 8 wherein said means for producing the Fourier harmonic components of the square wave frequency modulated signal include balanced modulators which modulate respective input signals thereto according to the required time functions.

10. In an omnidirectional navigation system for aircraft, means to radiate omnidirectionally a reference phase signal which is amplitude modulated at a frequency $f_1$, means to radiate a variable phase signal which is frequently modulated by a signal of approximately square waveform to produce a rotating field, said variable phase signal being frequency modulated at said frequency $f_1$, said amplitude modulated reference phase signal being phase locked with said variable phase signal whereby bearing information may be derived from said signals at a receiver with reference to a point at which both said signals will be received exactly in phase.

* * * * *